United States Patent [19]

Fredley

[11] Patent Number: 4,899,810

[45] Date of Patent: Feb. 13, 1990

[54] LOW PRESSURE DROP CONDENSER/HEAT PIPE HEAT EXCHANGER

[75] Inventor: Joseph E. Fredley, Holland, Pa.

[73] Assignee: General Electric Company, East Windsor, N.J.

[21] Appl. No.: 111,338

[22] Filed: Oct. 22, 1987

[51] Int. Cl.[4] .......................... F28D 15/02; F28B 1/02
[52] U.S. Cl. .................................. 165/41; 165/104.14; 165/104.26; 165/110; 165/156
[58] Field of Search ............ 165/41, 156, 110, 104.14, 165/104.26

[56] References Cited

U.S. PATENT DOCUMENTS

| 4,286,653 | 9/1981 | Edwards | 165/156 |
| 4,333,525 | 6/1982 | Ikin et al. | 165/156 |

FOREIGN PATENT DOCUMENTS

| 2708377 | 8/1978 | Fed. Rep. of Germany | 165/156 |
| 1183757 | 2/1959 | France | 165/156 |

OTHER PUBLICATIONS

"Application of Capillary Pumped Look Heat Transport Systems to Large Spacecraft", by Chalmers et al., published by American Institute of Aeronautics and Astronautics, in conjunction with the 4th joint Thermophysics and Heat Transfer Conference, Jun. 1986.
A paper entitled, "A Low Pressure Drop Heat Exchanger With Integral Heat Pipe" published in Proceedings of the 1988 National Heat Transfer Conference, by Fredley et al., Jul. 24–27, 1988.

Primary Examiner—Albert W. Davis, Jr.
Attorney, Agent, or Firm—William H. Meise

[57] ABSTRACT

A thermal control system adapted for test in a 1G gravity environment and for operation as a microgravity environment includes a capillary pumped loop with a wicked evaporator which produces a coolant vapor head of about ½ PSI upon absorbing heat from a heat source. A heat pipe includes a cylindrical portion adapted for absorbing heat, and also includes a radiator panel which rejects absorbed heat. A heat exchanger coupled to receive coolant vapor from the wicked evaporator includes a manifold which directs the vapor to a plurality of parallel fluid channels helically wound about and thermally coupled with the heat absorbing portion of the heat pipe. A liquid manifold is coupled to the liquid side of the fluid channels for receiving cooled liquid, which is returned to the wicked evaporator. The helically disposed fluid channels are dimensioned so that the surface tension forces of the coolant liquid are at least large compared with gravitational forces, and so that the centrifugal forces due to the helical disposition of the fluid channel at least aid in making the flow regimes similar in both microgravity and 1-G testing conditions.

12 Claims, 5 Drawing Sheets

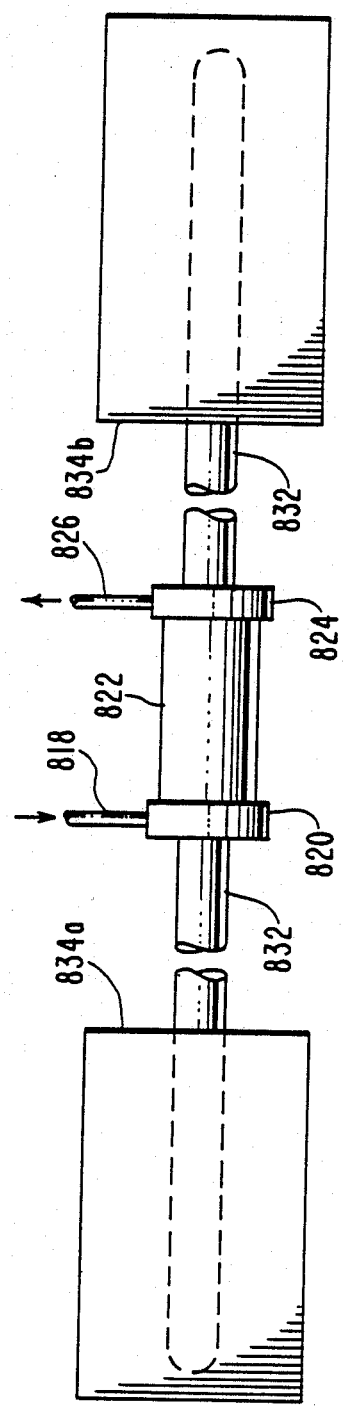
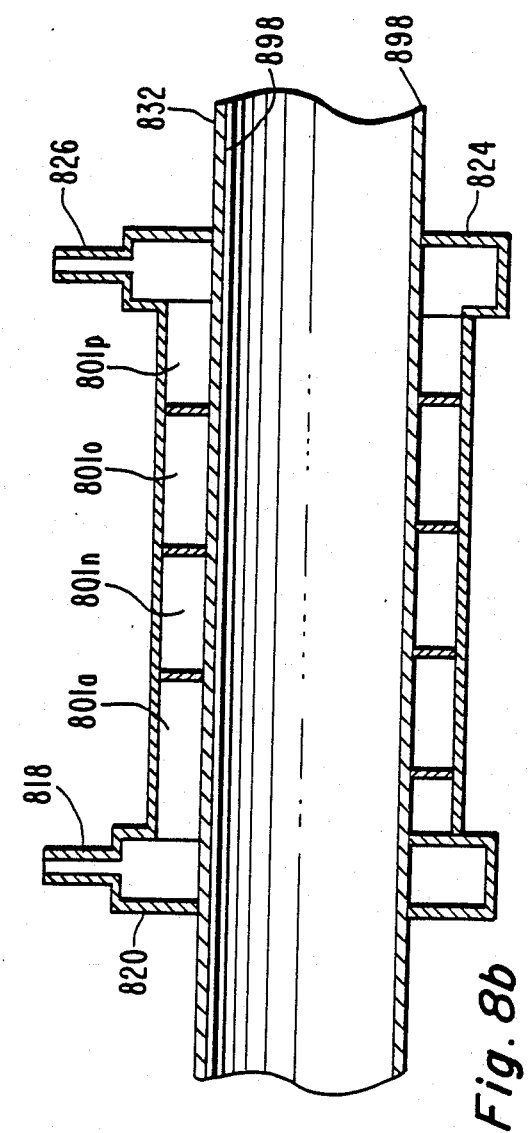

LOW PRESSURE DROP CONDENSER/HEAT PIPE HEAT EXCHANGER

This invention relates to heat exchangers and, more particularly, to heat exchangers using heat pipes in a micro-gravity environment.

Future spacecraft will use higher power in their operating systems, and will consequently require more heat dissipation capability, and will have more stringent heat transfer requirements. Compliance with these requirements necessitates development of thermal control techniques with capabilities far exceeding those in current use. A fundamental requirement is a heat acquisition, transport and rejection system capable of simultaneously accommodating large heat loads, high heat density sources, long transport distances and varying operational parameters. The heat loads and heat flux densities which are expected in the future will be on the order of a magnitude greater than those used in current spacecraft. A desirable type of system is that type which uses a two phase thermal control system. Two phase means that type of thermal control system in which a heat transfer fluid enters a condenser in the form of vapor and exits, after condensation, in the form of a liquid.

Economic considerations require that the mission life of spacecraft exceed ten years. Spacecraft designs are therefore evolving which permit servicing of defective parts, addition of growth segments, and/or replacement of spent or obsolete hardware. These enhanced operational features can best be accommodated by modularized spacecraft. Modularized design present a new set of design considerations and challenges to the thermal control subsystems designer.

Modular designs require connectable/disconnectable devices through which thermal energy may be transported. Also, in a modular spacecraft the thermal control subsystem must be adapted to mechanical configuration changes and additional or changed heat loads.

It is advantageous in designing heat exchangers and other portions of thermal control subsystems, to select not only those that will work and are practical in a zero gravity or micro-gravity environment, but which is addition can be tested in a an Earth gravity environment and work in approximately the same manner in a micro-gravity environment.

In the prior art it is known to provide mechanically pumped systems in which cooled liquid is piped from a condenser over a supply line to cold plates, at which the liquid absorbs heat and evaporates. The art includes mechanically pumped loops, capillary pumped loops and hybrids of mechanically pumped and capillary loops. It is also desirable in some cases to avoid the use of a mechanical pump in order to circulate the liquid. The capillary pump system is advantageous because it requires no moving parts, but it has the disadvantage that it generates a pressure potential or head of only about one-half pound per square inch ($\frac{1}{2}$ PSI) (which is about 3200 N/m$^2$) and this requires a system in which the system components, and in particular the condenser or condensers, have very low pressure drop.

SUMMARY OF THE INVENTION

In accordance with one embodiment of the present invention an improved low pressure drop heat exchanger compatible with a micro-gravity environment is provided by a plurality of condenser tubes helically wound about and thermally coupled to a heat tube or heat pipe. The condenser tubes are adapted at one end to receive hot fluid and at the opposite end to produce the cooled or condensed heat exchange fluid. The end of the heat tube or heat pipe remote from the helical condenser tubes is coupled to a heat rejection device such as a radiation panel.

DESCRIPTION OF THE DRAWING

In the drawing:

FIGS. 2a and 2b are referred to together as FIG. 2, wherein FIG. 2a is a cut-away perspective or isometric view of a portion of a heat exchanger of FIG. 1, and FIG. 2b is an end view of the heat exchanger in accordance with an embodiment of the present invention taken along section lines b—b in FIG. 2a;

FIG. 8a is a view of another embodiment of a condenser, and FIG. 8b is a section of the condenser thereof taken in the plane of the FIG. 8a;

DESCRIPTION OF THE INVENTION

Figure 1:
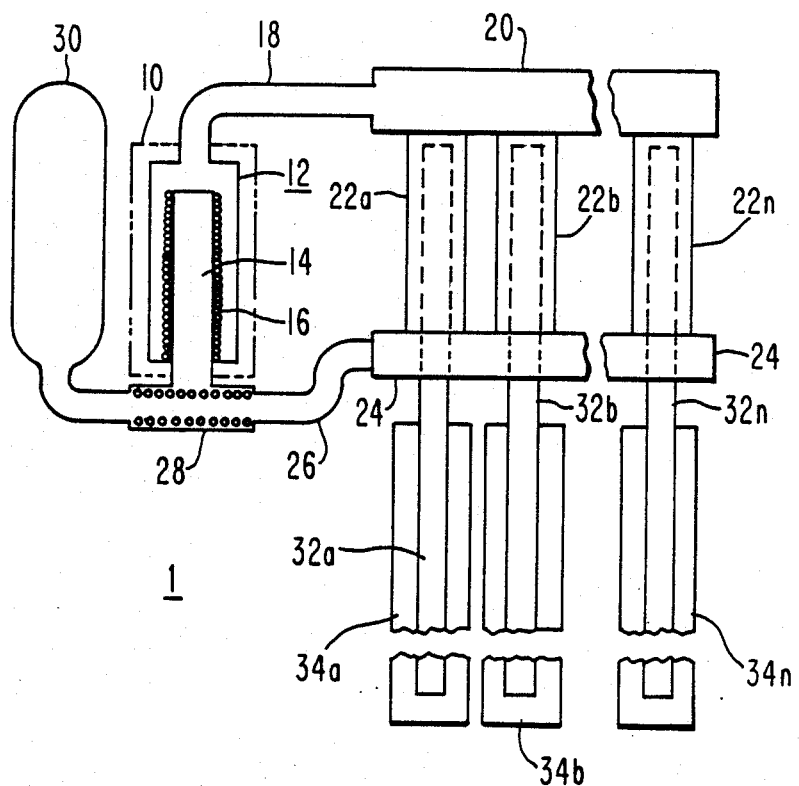
FIG. 1 is a schematic diagram of an overall capillary pumped loop thermal control system in accordance with one embodiment of the present invention, including a plurality of condensers, each with a heat exchanger.

FIG. 1 is a system block diagram of a thermal control apparatus embodying the invention. In FIG. 1, thermal control system 1 includes a heat generating portion of a spacecraft, designated as 10, which may include electronic packaging and amplifiers and other heat generating sources. Thermally coupled to heat generating portion 10 is a wicked evaporator 12 including a housing with a liquid channel 14 communicating with a wick 16. Heat from source 10 causes liquid in channel 14 to flow into the wick 16 and to be evaporated to form a coolant vapor. The coolant vapor flows from evaporator 12 through a vapor pipe 18 to a plenum or manifold 20. Manifold 20 distributes the heat-laden coolant vapor among a plurality of condensers 22a, 22b ... 22n. Vapor pipe 18 and manifold 20 of a capillary pumped loop should be insulated to avoid loss of heat, which might result in condensation of coolant vapor to the liquid form before distribution of the vapor among the condensers by manifold 20, which in turn might cause liquid to be distributed preferentially to some of the condensers and thereby cause system imbalance. The coolant vapor is condensed in condensers 22 to a sub-cooled liquid, which is collected in a liquid plenum 24. The liquid coolant is returned to evaporator 12 by a return pipe 26 and through a wicked isolator 28, which prevents any heat pipe vapor from entering liquid channel 14 and depriming the system. A coolant reservoir 30 is connected to isolator 28 and liquid pipe 26 for system pressure and fluid inventory control.

As described below, each of condensers 22a, 22b . . . 22n includes a heat exchanger coupled to a heat pipe for carrying away latent and sensible heat derived from the coolant fluid, and a radiator panel or panels coupled to an end of the heat pipe for rejecting the heat by radiation into space. In FIG. 1, condensor 22a is coupled to a heat pipe 32a, condensor 22b is connected to a heat pipe 32b, etc. Such heat pipes transport heat from an evaporator section to a condenser section of the heat pipe, while maintaining a substantially constant temperature across the length of the heat pipe. The end of heat pipe 32a remote from condenser 22a is connected to a radiator panel 34a, and the remaining heat pipes 32b, . . . 32n are each associated with a corresponding radiator panel 34.

As known, present capillary pumped loops using ammonia generate a pressure potential of approximately ⅛ PSI. This relatively small pressure potential must support sufficient coolant flow in the capillary pumped loop to carry the heat produced by heat source 10. It is therefore imperative that the elements of the loop such as the pipes and condenser have a very low pressure drop at the desired coolant flow rate. The pipes providing flow of fluid may be provided with smooth interior walls, and may be made large enough to provide very low pressure drop. It is also important that the condenser have a low pressure drop.

Figure 2A:
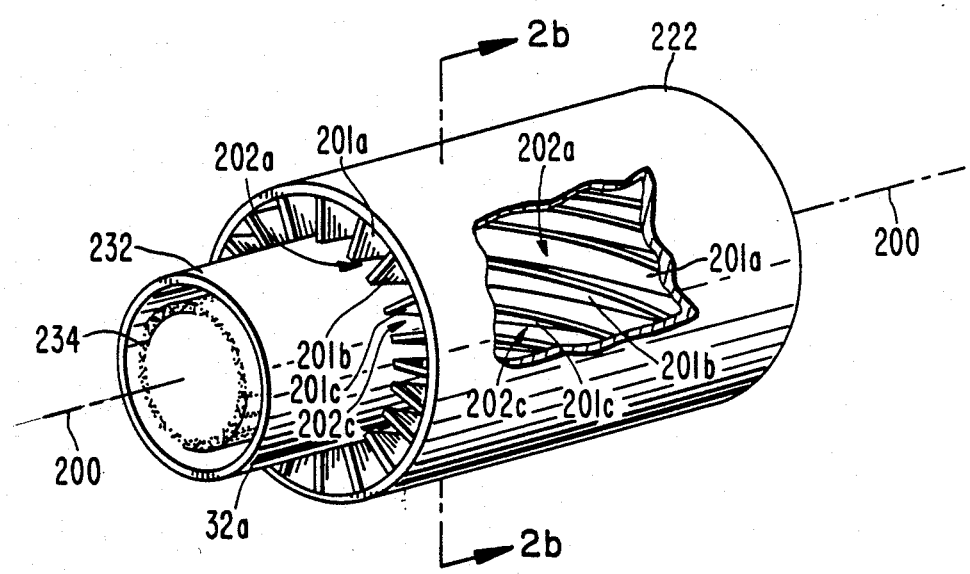
Figure 2B:
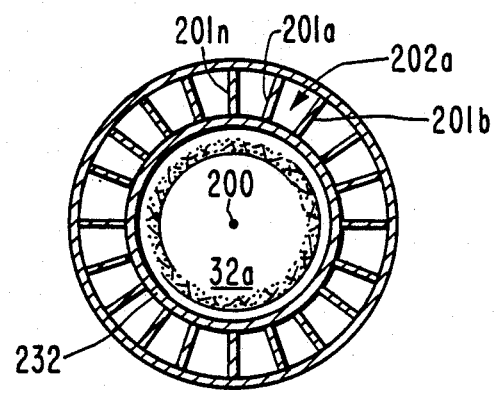

FIG. 2a illustrates, in perspective or isometric view, and partially cut away, a portion of the condenser unit 22a of FIG. 1. A portion of heat pipe 32a as illustrated includes a thermally conductive cylindrical pipe 232 and a wick illustrated as 234 centered on an axis 200 for carrying condensed liquid from the condenser portion of heat pipe 32a (i.e.; that portion of heat pipe 32a thermally coupled to radiator panel 34a) to the evaporator section of heat pipe 32a, which is within condenser 22a. The operation of such heat pipes is well known, and further explanation is not necessary. Evaporator 22a includes a cylindrical outer housing 222 spaced from outer surface 232 of heat pipe 232a and coaxial with heat pipe 232a. The region between outer housing g222 of condenser 22a and the outer surface 232 of heat pipe 32a is occupied by a plurality of mutually parallel fins, septa or vanes, designated as 201. Vanes 201 are relatively thin, and are oriented with their major flat surfaces parallel to radial lines passing orthogonally through common axis 200 of heat pipe 32a and ousing 222. Thus, vanes 201 divide the region between outer housing 222 and the outer surface of wall 232 of heat pipe 32a into a plurality of fluid channels 202. These fluid channels are roughly rectangular in shape, as illustrated in FIG. 2b and in FIGS. 3-7. The fluid channels 202 defined by vanes 201, housing 222 and outer surface 232 are dimensioned so that the surface tension forces of a liquid coolant which wets the walls is at least significant compared with the force of gravity acting upon the coolant liquid in a one-gravity (1 G) environment, i.e. in the ordinary gravity at the surface of the earth. The average diameter or side of a fluid channel is selected to be about 1/10 inch when the coolant fluid is ammonia ($NH_4$). With such a dimensioning, the surface tension forces are substantially equal to the 1 G gravitational forces, so that the form of the liquid flow of condensed coolant fluid through the channels tends to be similar both in a 1 G gravity and in a microgravity environment.

Fins or vanes 201 take a helical path about axis 200. That is, even though all fins or vanes are radial as illustrated in the cross section of FIG. 2b at all cross-sections of the condensor 22a, the fluid channels such as fluid channel 202a are helically formed or spiral around the outside of wall 232 of heat pipe 32a.

Relatively thin vanes 201 represent a relatively small proportion of the total cross-sectional area of the region between outer housing 222 and wall 232 of heat pipe 32a. Consequently, fluid flow in an axial direction through the many parallel fluid paths occurs with a relatively low resistance to the fluid flow, and consequently with a relatively low pressure drop. The spiral path of the fluid channels imparts a "spinning" motion to the coolant fluid flowing therethrough, which results in a centrifugal force which tends to circulate liquid toward the portion of each fluid channel adjacent outer housing 222. This centrifugal force, together with the surface tension forces, tends to cause the flow of coolant fluid through channels 202 in a micro-gravity environment to be approximately the same as the flow of coolant fluid in a 1 G gravity environment, as explained in more detail below.

Figure 3A:
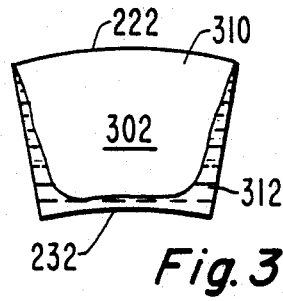
FIGS. 3a, b and c, referred to jointly as FIG. 3, represent the distribution of vapor and liquid coolant in a straight, nonhelical fluid channel of a heat exchanger similar to that of FIG. 2 at various positions along the fluid channel, in a microgravity environment.
Figure 3B:
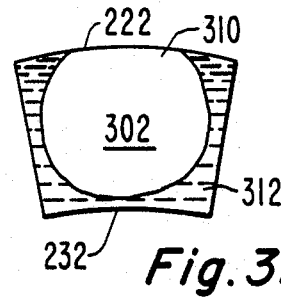
Figure 10:
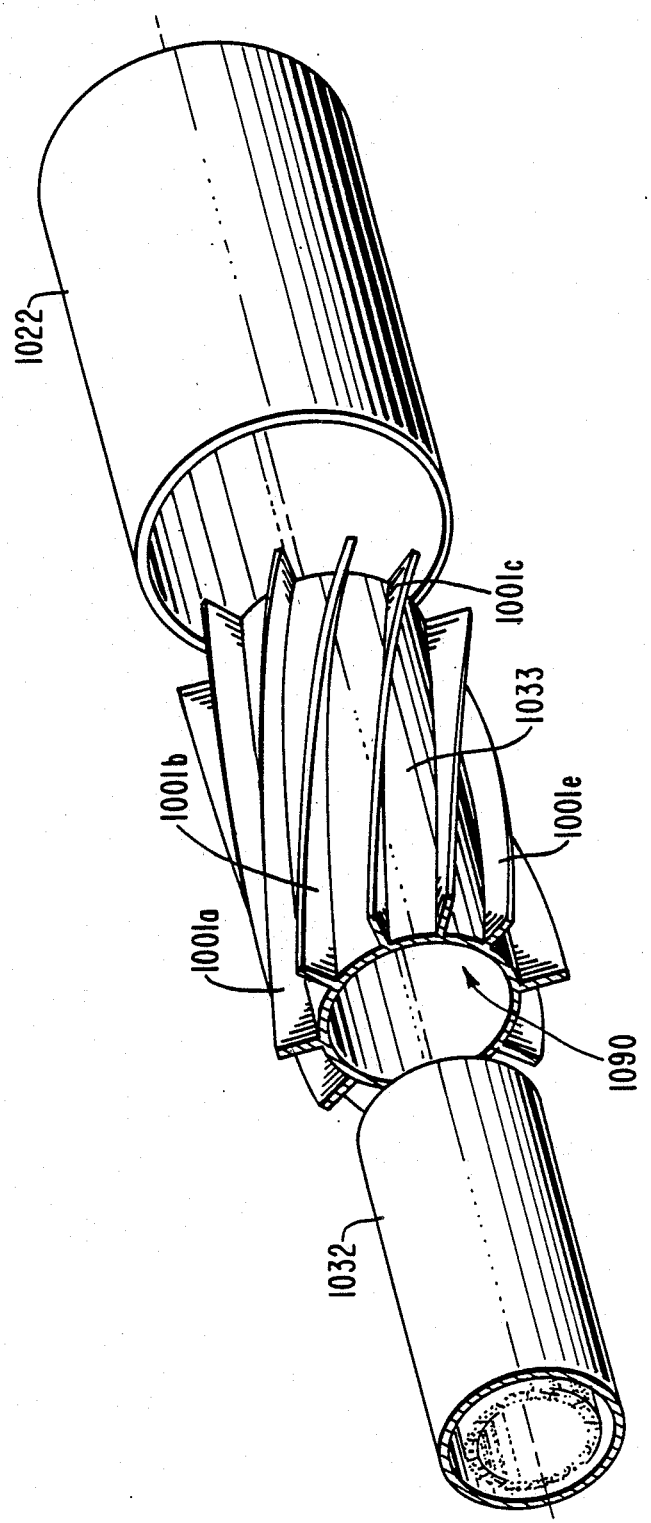
FIG. 10 illustrates an exploded perspective or isometric view of another embodiment of a heat exchanger according to the invention.

FIG. 3 represents various cross-sections of a fluid channel 302 similar to fluid channel 202 illustrated in FIG. 2, at various points between the vapor inlet side and the liquid outlet side, but for a straight-through, unspiraled or non-helically arranged passage. The vapor and liquid distributions of FIG. 3 represent those occuring in a microgravity environment. FIG. 3a illustrates a region of fluid channel 302 near the vapor manifold, in which a small amount of vapor 310 has condensed to form liquid 312. The condensation tends to occur on the surface of wall 232 of the heat pipe, which withdraws latent heat so the liquid tends to condense onto the surface of wall 232 of the heat pipe. For purposes of explanation, the wall 232 of the heat pipe 32a is considered equivalent to the wall of a vane-supporting sleeve closely fitting around wall 232, as illustrated in FIG. 10. As illustrated in FIG. 3a, surface tension forces tend to draw the condensed liquid 312 part-way around the inner periphery of the fluid channel FIG. 3b illustrates a condition farther along channel 302 representing the progression of the coolant fluid towards a more fully condensed state, in which a larger portion of the fluid has condensed into a liquid form. The surface of outer housing 222 is still warmer than the remaining walls, so that condensation preferentially takes place on the surface of heat pipe wall 232 and on the side walls, and surface tension forces tend to reduce the peripheral surface of the vapor portion or to form the remaining vapor into a bubble-like shape.

Figure 3C:
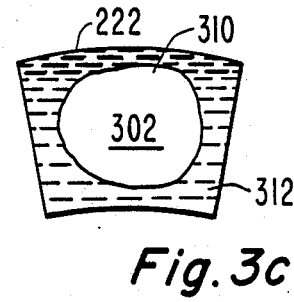

FIG. 3c illustrates a condition yet further along fluid channel 302, closer to the liquid outlet adjacent manifold 24 of FIG. 1. Surface tension forces have forced the vapor portion 310 to assume a tubular shape spaced from the walls of the channel, which in cross-section appears as a bubble. The vapor moves through the central, vapor-containing portion of channel 302 illustrated in FIGS. 3a, b, and c, and may generate waves in a longitudinal direction if the vapor flow rate is sufficient. When the height of the waves is sufficient to close off the remaining vapor channel, the flow becomes sectionalized, at the closed-off point appearing to be all-liquid in cross-sections such as those of FIG. 3, and at other points between closed-off points having the appearance of FIG. 3c. The sequential slugs of vapor are reduced in size as the coolant approaches the liquid outlet, and finally disappear. This generator of longitudinal waves in the liquid, and the resulting slugs of vapor, also occur in the flows illustrated in FIGS. 4–7, described below.

Figure 4A:
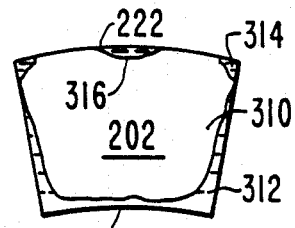
FIGS. 4a, b and c, referred to jointly as FIG. 4, represent the distribution of vapor and liquid coolant in a microgravity environment at various positions within a fluid channel helically disposed about a heat pipe as illustrated in FIG. 2.
Figure 4B:
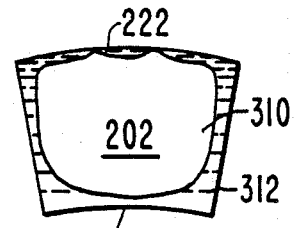
Figure 4C:
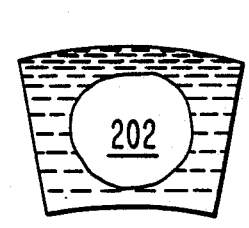

FIGS. 4a, 4b, and 4c illustrate the conditions within helically disposed fluid channel 202 as illustrated in FIG. 2 under microgravity conditions. In FIG. 4a, in addition to the effects of surface tension in causing liquid to leave lower surface of heat pipe wall 232, the centrifugal forces imparted to the fluid cause a portion of the liquid to move to the corners and to the center of the surface of outer housing 222, as illustrated by liquid portions 314 and 316. At a location along the helical channel 202 where the condensation roughly corresponds to that of FIG. 3b, the effect of the helical disposition of fluid channel 202 is illustrated in FIG. 4b. As illustrated therein, centrifugal forces result in the appearance of liquid over almost the entirety of the inner surface of the fluid channel. FIG. 4c illustrates the effect of the helical disposition of the fluid channel at a more fully condensed condition, corresponding to that of FIG. 3c. The helical disposition makes almost no difference under these conditions, and the vapor is concentrated into the form of a tube (and appears as a circular bubble) in FIG. 4c. Waves can appear in the liquid and result in slugs of fluid and vapor, as described in conjunction with FIG. 3.

Figure 5A:
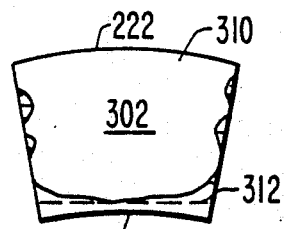
FIGS. 5a, b and c, referred to jointly as FIG. 5, represent vapor and liquid distribution within a portion of a straight fluid channel in a one-gravity (1 G) environment when the fluid channel is upright.
Figure 5B:
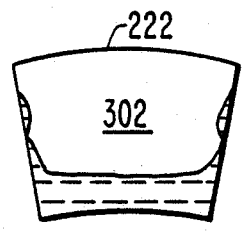
Figure 5C:
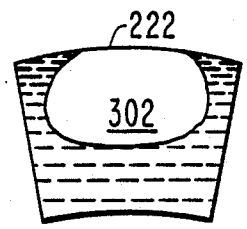

FIG. 5 represents the distribution of vapor and liquid coolant in a portion near the top of the condenser of a channel 202 similar to channel 202 of FIG. 2, but which is straight rather than helical, and which is disposed in a one-gravity environment. The significance of its being a top portion can be understood by considering that in a microgravity environment, there is no "up" or "down", so FIGS. 3 and 4 apply to all portions of all fluid channels of the condenser, whereas in a 1 G environment, the force of gravity acts on a portion of a fluid channel which is on top of the condenser in a manner which is the inverse of the action on a portion which is on the bottom side of the condenser. FIGS. 5a and 5b represent the distribution of liquid 312 and vapor 310 at locations relatively near the vapor plenum, where only a moderate amount of condensation has occurred. Gravitational forces tend to counteract the surface tension forces, so that relatively more liquid sits adjacent the bottom surface, which is the surface of heat pipe wall 232, than in FIGS. 3a and 3b representing the microgravity equivalent. In FIG. 5c, representing a cross-section of the straight channel nearer the liquid end of the condenser, the remaining vapor forms a tube which appears in cross-section as a bubble, which rises to the top of the channel.

Figure 6A:
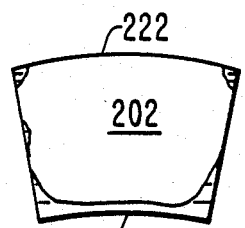
FIGS. 6a, b and c, referred to jointly as FIG. 6, represent the fluid distribution within an upright portion of a helically disposed fluid channel in a 1 G environment.
Figure 6B:
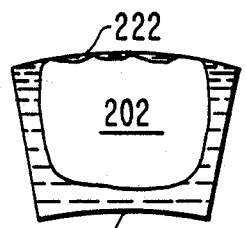
Figure 6C:
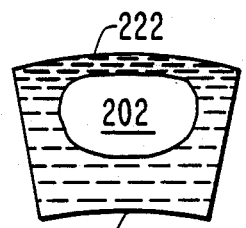

FIG. 6 represents the distribution of vapor 310 and liquid 312 in a helically disposed channel at the top of the condenser in a 1 G environment. The helical path results in centrifugal force which tends to offset the effects of gravity on the liquid, so FIGS. 6a and 6b by comparison with the straight channel distributions of FIGS. 5a and 5B have more of the liquid climbing the walls. FIG. 6c has the vapor bubble which is more centrally located within the channel than in the case of FIG. 5c.

Figure 7A:
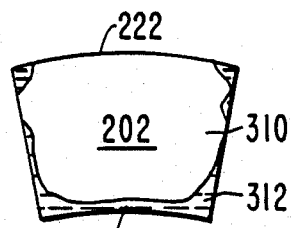
FIGS. 7a, b and c, referred to jointly as FIG. 7, represent the fluid distribution within an inverted portion of the helical fluid channel of FIG. 6 in a 1 G environment.
Figure 7B:
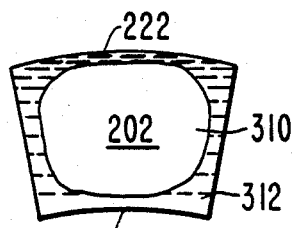
Figure 7C:
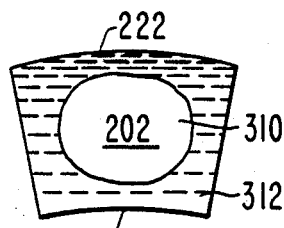

FIG. 7 represents the vapor and fluid distribution in a bottom portion of a helically disposed fluid channel in a 1 G environment. In this case, gravity aids the centrifugal forces, so the liquid in FIG. 7a climbs higher up the side walls of the fluid channels than in the case of FIG. 6a (helically disposed, top portion) and even puts some liquid, designated as 314, into corners of the channel. In FIG. 7b, both gravity and centrifugal forces aid in moving liquid against the surface of outer housing 222, thereby forming what amounts to a bubble of vapor centered in the fluid channel. This effect is more pronounced in FIG. 7c.

Comparing straight (non-helical) channels in a microgravity environment (FIG. 3), with straight channels in a 1 G environment (FIG. 5), it can be seen that the fluid distributions are dissimilar over major portions of the condenser length. A comparison of the distributions of microgravity helically disposed channels (FIG. 4) with 1 G helically disposed top and bottom channels (FIGS. 6 and 7) shows a substantial resemblance at corresponding cross-sections. Thus, the heat flows for a condenser such as 32a of FIG. 2 with helically disposed channels in microgravity should be similar to the heat flows under 1 G conditions, so testing can be accomplished on the ground before satellite launch.

FIG. 8 illustrates a condenser according to the invention in which a single cylindrical heat pipe 832 includes radiator panels 834a and 834b at opposite ends, and a heat exchanger 822 therebetween. The inner portions of heat exchanger 822 are coupled to a vapor pipe 818 for communicating heat-laden vapor from a source (not illustrated) to a manifold 820 disposed at one end of heat exchanger 822, and is also coupled to a liquid manifold 824 and al liquid pipe 826 for collecting and carrying away subcooled liquid. The inner portions of heat exchanger 822 may be identical to heat exchanger 22a as illustrated in FIG. 2. The cross-sectional view of FIG. 8b illustrates outer wall 898 of heat pipe 832, but omits well known details of the interior of heat pipe 832. Also illustrated in FIG. 8b are cross-sections of vapor pipe 818 and vapor manifold 820 for distributing vapor substantially equally to a plurality of helically disposed channels (not separately designated) defined between the helically disposed septa, which are illustrated as 801a, 801n, 801o, 801p. The fluid which is condensed to liquid form during the travel of the fluid from left to right in FIG. 8b is collected in liquid manifold 824 and transferred to liquid pipe 826 for return to the evaporator.

A condenser with a heat pipe diameter of 0.6 inch (15 mm), 11 fluid channels with sides or diameters of about 1/10 inch (2.5 mm), and a length of each channel of about 41 inches (1050 mm), which make about 10 turns on an average diameter of about 0.8 inch, for use with ammonia has a pressure drop of about 0.04 PSI (280 N/m$^2$), and transfers about 0.45 kw at a flow rate of about 0.25 lbm/hr in each fluid channel with a temperature drop of 520 C. between the condensing fluid and the heat pipe fluid.

Figure 9:
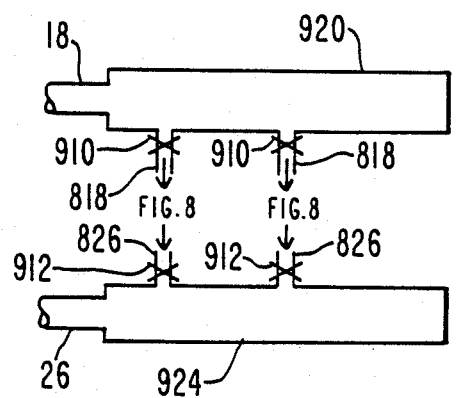
FIG. 9 is a diagram of a portion of a capillary pumped loop system in which fluid disconnects are used to allow removal and replacement of a condenser.

FIG. 9 illustrates vapor pipe 18, a vapor manifold 920 similar to vapor manifold 20 of FIG. 1, condensed liquid pipe 26, and a liquid manifold 924 similar to manifold 24 of FIG. 1, which may be used in a capillary pumped loop. FIG. 9 differs from FIG. 1 in that discrete vapor pipes 818 and liquid pipes 826 connect vapor manifold 920 and liquid manifold 924 to manifolds 820 and 824, respectively, of condensers similar to that illustrated in FIG. 8. The use of discrete vapor and liquid pipes for each condenser allows the user of fluid disconnects (valves or couplings) such as 910, 912 in pipes 818, 826, respectively. The disconnects allow an individual condenser to be removed from the capillary pumped loop for repair or replacement.

FIG. 10 illustrates another arrangement of the invention in which vanes 1001a, 1001b ... are machined from a monolithic block and integral with a vane-supporting sleeve 1033. The interior diameter of a bore 1090 within vane-supporting sleeve is dimensioned to cause sleeve 1033 to fit tightly around the outer wall of a heat pipe 1032. Sleeve 1033 and associated vanes 1001 may be press-fitted onto heat pipe 1032, as by heating vane-supporting sleeve 1033 during the press-fitting. An outer wall 1022 in the form of a simple sleeve is dimensioned to fit closely over the exterior of vanes 1001. Such a structure is equivalent to the structure illustrated in FIG. 2, and operation is the same, except that the inner wall of each fluid channel is constituted by a portion of the surface of sleeve 1033 rather than the wall of the heat pipe. This has little practical effect. The thermal contact between the wall of heat pipe 1032 and the surface of bore 1090 of sleeve 1033 may be improved, if desired, by brazing, soldering or the like to provide a metallurgical bond. Similarly, the tips of vanes 1001 may be bonded to the inner surface of sleeve 1022.

Other embodiments of the invention will be apparent to those skilled in the art. For example, the helical tubes wound about and thermally coupled to the heat pipe may be in the form of tubular pipes bonded to the outer surface of the heat pipe rather than in the form of fins in the region between a cylindrical outer housing and the heat pipe surface, as illustrated in FIG. 2, whereupon no outer housing such as 222 is needed. While the capillary pumped loop has been illustrated and discussed as including a single evaporator such as 12 of FIG. 1, greater heat flow may be accommodated by the use of multiple, parallel-connected evaporators. Other coolant fluids, such as acetone, dichlorodifluoromethane (Freon), or methanol, may be used instead of ammonia. Fins or vanes such as 201 of FIGS. 2a and 2b may be metallurgically or otherwise bonded to the adjacent heat pipe wall such as 232 and/or condenser outer housing such as 222, or they may merely be a close fit. In principle, it would be desirable to form the fins or vanes as a monolithic whole together with the wall (232) of the heat pipe and/or housing 222, but the machining or forming process is difficult.

I claim:

1. A heat exchanger for a spacecraft having a source of heat, a heat source tube passing through said source of heat, a coolant, and a radiator, comprising in combination:
   a heat pipe having one end coupled to said radiator;
   a plurality of passages helically wound about said heat pipe, said passages being connected to common first and second junctions at opposite first and second ends of said plurality of passages, said first and second junctions being coupled to respective first and second opposite ends on said heat source tube, said coolant being of a material that tends to be vaporized by said source of heat at said first end of said plurality of passages and tends to liquify at said second end of said plurality of passages, each of said plurality of passages being of a sufficiently small diameter that helical circulation along the walls is primarily due to surface tension and secondary flow effects.

2. The combination of claim 1 wherein the diameter of each of said passages is on the order of 1/10 th of an inch.

3. A heat exchanger adapted for testing in a 1 G gravity environment and operation in a microgravity environment, comprising:
   an elongated heat pipe including a portion adapted to be coupled to a heat-rejecting plate for rejecting heat, and also including an elongated cylindrical portion adapted for receiving heat which is to be rejected;
   a source of a flow of heat-laden fluid which is to be cooled;
   a plurality of channels helically wound about an thermally coupled to said elongated cylindrical portion of said heat pipe, said plurality of channels being coupled for receiving said heat-laden fluid, said channels being wetted by said fluid and having cross-sectional dimensions selected so that the surface tension forces of said fluid are predominant relative to the gravitational forces on said fluid in a 1 G gravity environment, and the helix dimensions being selected so that centrifugal forces are at least significant relative to said gravitational forces in said 1 G gravity environment, whereby heat is transferred from said fluid in said channels to said heat pipe for rejection, resulting in cooled fluid, in much the same manner in a microgravity environment as in a 1 G gravity environment, and testing can therefore take place in a 1 G gravity environment, and operation can take place in a microgravity environment.

4. An exchanger according to claim 3 wherein said cooled fluid is returned to said source of a flow of heat-laden fluid for reheating.

5. An exchanger according to claim 4 wherein said cooled fluid is a subcooled liquid.

6. An exchanger according to claim 4 wherein said fluid is ammonia.

7. An exchanger according to claim 6 wherein said channels have maximum cross-sectional dimensions of approximately 1/10 inch (2.5 mm).

8. An exchanger according to claim 6 wherein the pressure drop across said plurality of channels is less than about 0.04 PSI ($280 N/m^2$).

9. An exchanger according to claim 7 wherein said helix has an average diameter of approximately 0.8 inch for a linear flow rate within each of said channels of about 0.25 lbm/hour.

10. A thermal control system for a spacecraft, comprising:
    a capillary pumped system for pumping fluid ammonia around a closed loop, said system including a wicked evaporator for absorbing heat and for using the absorbed heat to vaporize ammonia to produce ammonia vapor at low pressure;
    at least one condenser coupled to said wicked evaporator for receiving said ammonia vapor, said condenser including a heat rejecting radiator thermally coupled to one end of an elongated heat pipe including a cylindrical portion adapted for receiving heat, said condenser further including a plurality of fluid channels coupled in parallel for receiving said ammonia vapor, said fluid channels being helically wound about said cylindrical portion of said heat pipe and thermally coupled thereto, said fluid channels further having cross-sectional dimensions selected to cause surface tension forces between said ammonia in said liquid form and the interior surfaces of said fluid channels to be at least significant in relation to gravitational forces when operated in a 1 G gravity environment, whereby said condenser cools said ammonia vapor to a liquid form; and means for returning said liquid ammonia to said wicked evaporator.

11. A thermal control system according to claim 10 wherein said condenser includes, in addition to said radiator thermally coupled to one end of said heat pipe, a second radiator thermally coupled to a second end of said heat pipe, said cylindrical portion of said heat pipe being thermally coupled between said one end and said second end of said heat pipe.

12. A system according to claim 10 wherein said cross-section dimensions are about 1/10 inch (2.5 mm).

* * * * *